US012585675B2

(12) United States Patent
Neubeck

(10) Patent No.: US 12,585,675 B2
(45) Date of Patent: Mar. 24, 2026

(54) HYBRID POSITIONAL POSTING LISTS

(71) Applicant: MICROSOFT TECHNOLOGY LICENSING, LLC., Redmond, WA (US)

(72) Inventor: Alexander Ulrich Neubeck, Obermichelbach (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 463 days.

(21) Appl. No.: 17/881,063

(22) Filed: Aug. 4, 2022

(65) Prior Publication Data

US 2024/0045846 A1     Feb. 8, 2024

(51) Int. Cl.
G06F 16/31          (2019.01)

(52) U.S. Cl.
CPC .................................. G06F 16/319 (2019.01)

(58) Field of Classification Search
CPC ..................................................... G06F 16/319
See application file for complete search history.

(56) References Cited

U.S. PATENT DOCUMENTS

| | | | |
|---|---|---|---|
| 6,216,123 B1 * | 4/2001 | Robertson | ........... G06F 16/3341 |
| 8,856,138 B1 | 10/2014 | Neubeck | |
| 10,242,071 B2 | 3/2019 | Hopcroft et al. | |
| 2007/0220023 A1 | 9/2007 | Dean et al. | |
| 2013/0151534 A1 * | 6/2013 | Luks | ........................ G06F 16/41 |
| | | | 707/742 |
| 2016/0378803 A1 | 12/2016 | Hopcroft et al. | |
| 2022/0156329 A1 | 5/2022 | Reynolds et al. | |

OTHER PUBLICATIONS

"Boolean Retrieval", Retrieved from: https://web.archive.org/web/20180619054001/http://theo.cs.ovgu.de/lehre08s/anfrage/BooleanRetrieval.pdf, Jun. 19, 2018, 24 Pages.
Buttcher, et al., "Information Retrieval Implementing and Evaluating Search Engines", In Publication of The MIT Press, Aug. 20, 2010, 624 Pages.
Manning, et al., "An Introduction to Information Retrieval", In Publication of Cambridge University Press, Apr. 1, 2009, 581 Pages.
Kornel, et al., "RMP—Rust MessagePack", Retrieved from: https://crates.io/crates/rmp-serde, Apr. 19, 2022, 2 Pages.
Lemire, Daniel, "How fast is bit packing?", Retrieved from: https://lemire.me/blog/2012/03/06/how-fast-is-bit-packing/, Mar. 6, 2012, 8 Pages.
"International Search Report and Written Opinion Issued in PCT Application No. PCT/US23/027457", Mailed Date: Sep. 14, 2023, 11 Pages.

* cited by examiner

*Primary Examiner* — Amanda L Willis
(74) *Attorney, Agent, or Firm* — Workman Nydegger

(57) ABSTRACT

An information retrieval system uses an inverted indexing system composed of hybrid positional posting lists. A hybrid positional posting list includes a number of postings, where each posting contains a single numeric value to represent both the document containing a term and the location of the term in the document. When the number of postings for a document exceeds a threshold, a single-valued posting represents all the locations of a term in a document and the locations within the document. When the number of postings for a document is less than a threshold, each location of a term and the associated document is represented by a single-valued posting. In this manner, the storage requirements for the inverted indexing system are reduced and the processing speed increased.

16 Claims, 9 Drawing Sheets

Figure 6:
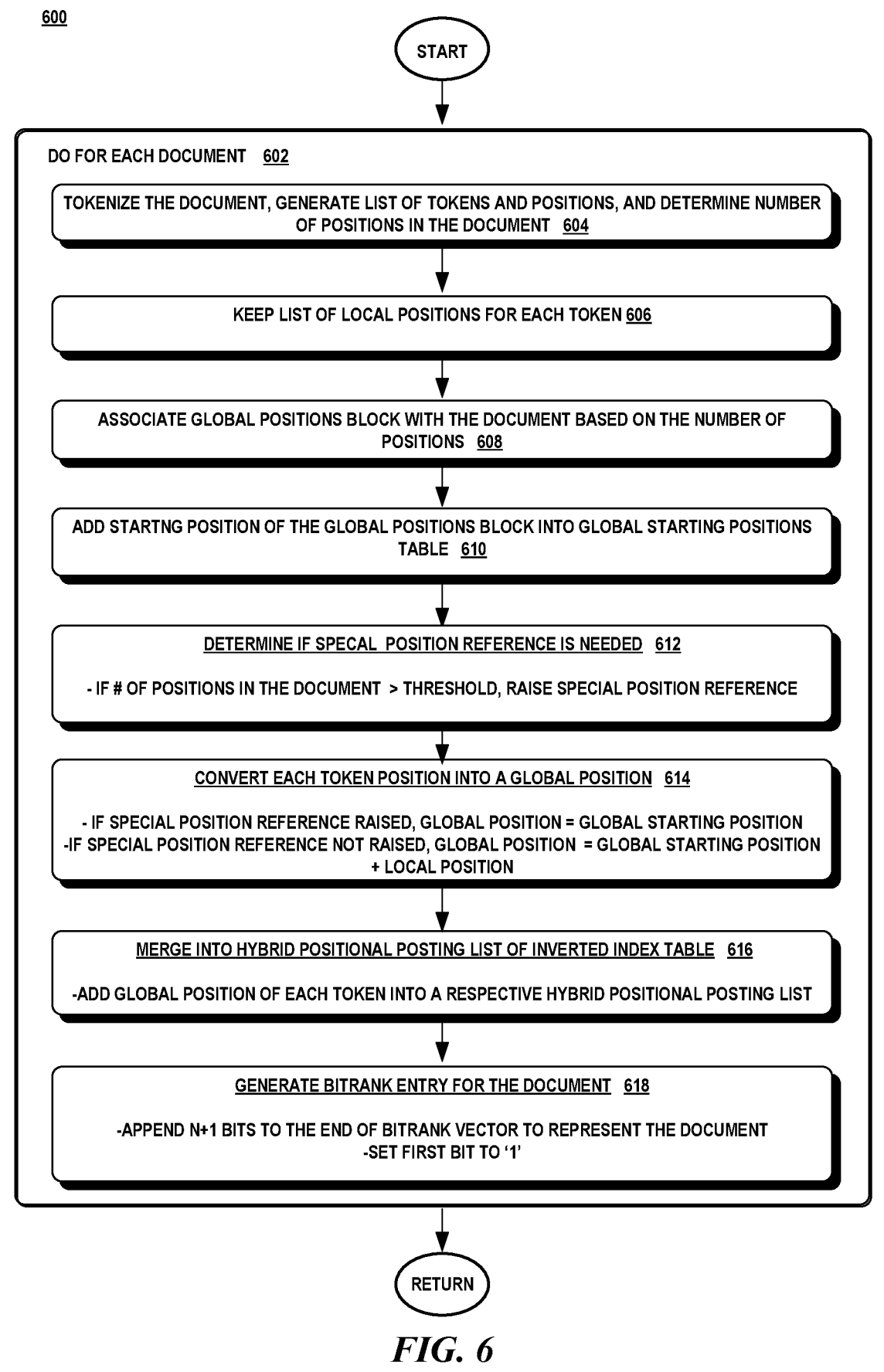

600

```
                    ┌─────────┐
                    │  START  │
                    └─────────┘
                         │
                         ▼
┌─────────────────────────────────────────────────────────────────┐
│ DO FOR EACH DOCUMENT   602                                        │
│  ┌─────────────────────────────────────────────────────────────┐ │
│  │ TOKENIZE THE DOCUMENT, GENERATE LIST OF TOKENS AND POSITIONS,│ │
│  │ AND DETERMINE NUMBER OF POSITIONS IN THE DOCUMENT   604      │ │
│  └─────────────────────────────────────────────────────────────┘ │
│                         │                                         │
│                         ▼                                         │
│  ┌─────────────────────────────────────────────────────────────┐ │
│  │ KEEP LIST OF LOCAL POSITIONS FOR EACH TOKEN 606             │ │
│  └─────────────────────────────────────────────────────────────┘ │
│                         │                                         │
│                         ▼                                         │
│  ┌─────────────────────────────────────────────────────────────┐ │
│  │ ASSOCIATE GLOBAL POSITIONS BLOCK WITH THE DOCUMENT BASED ON │ │
│  │ THE NUMBER OF POSITIONS   608                                │ │
│  └─────────────────────────────────────────────────────────────┘ │
│                         │                                         │
│                         ▼                                         │
│  ┌─────────────────────────────────────────────────────────────┐ │
│  │ ADD STARTNG POSITION OF THE GLOBAL POSITIONS BLOCK INTO     │ │
│  │ GLOBAL STARTING POSITIONS TABLE   610                        │ │
│  └─────────────────────────────────────────────────────────────┘ │
│                         │                                         │
│                         ▼                                         │
│  ┌─────────────────────────────────────────────────────────────┐ │
│  │ DETERMINE IF SPECAL  POSITION REFERENCE IS NEEDED   612     │ │
│  │                                                             │ │
│  │ - IF # OF POSITIONS IN THE DOCUMENT  > THRESHOLD, RAISE     │ │
│  │   SPECIAL POSITION REFERENCE                                 │ │
│  └─────────────────────────────────────────────────────────────┘ │
│                         │                                         │
│                         ▼                                         │
│  ┌─────────────────────────────────────────────────────────────┐ │
│  │ CONVERT EACH TOKEN POSITION INTO A GLOBAL POSITION   614    │ │
│  │                                                             │ │
│  │ - IF SPECIAL POSITION REFERENCE RAISED, GLOBAL POSITION =   │ │
│  │   GLOBAL STARTING POSITION                                  │ │
│  │ -IF SPECIAL POSITION REFERENCE NOT RAISED, GLOBAL POSITION  │ │
│  │   = GLOBAL STARTING POSITION + LOCAL POSITION               │ │
│  └─────────────────────────────────────────────────────────────┘ │
│                         │                                         │
│                         ▼                                         │
│  ┌─────────────────────────────────────────────────────────────┐ │
│  │ MERGE INTO HYBRID POSITIONAL POSTING LIST OF INVERTED      │ │
│  │ INDEX TABLE   616                                            │ │
│  │                                                             │ │
│  │ -ADD GLOBAL POSITION OF EACH TOKEN INTO A RESPECTIVE HYBRID │ │
│  │  POSITIONAL POSTING LIST                                    │ │
│  └─────────────────────────────────────────────────────────────┘ │
│                         │                                         │
│                         ▼                                         │
│  ┌─────────────────────────────────────────────────────────────┐ │
│  │ GENERATE BITRANK ENTRY FOR THE DOCUMENT   618              │ │
│  │                                                             │ │
│  │ -APPEND N+1 BITS TO THE END OF BITRANK VECTOR TO REPRESENT │ │
│  │  THE DOCUMENT                                               │ │
│  │ -SET FIRST BIT TO '1'                                       │ │
│  └─────────────────────────────────────────────────────────────┘ │
└─────────────────────────────────────────────────────────────────┘
                         │
                         ▼
                    ┌─────────┐
                    │ RETURN  │
                    └─────────┘
```

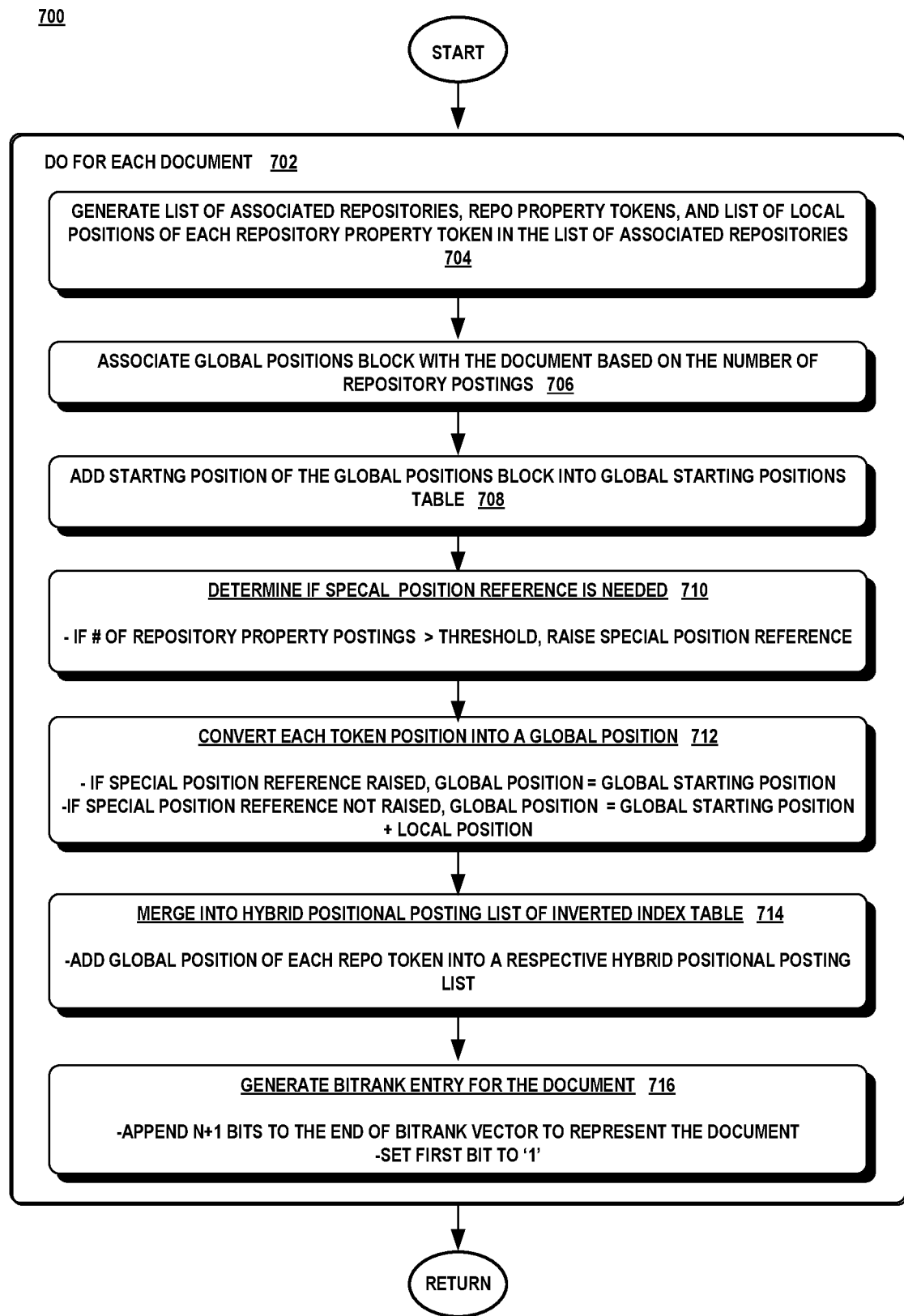

START

DO FOR EACH DOCUMENT    702

GENERATE LIST OF ASSOCIATED REPOSITORIES, REPO PROPERTY TOKENS, AND LIST OF LOCAL POSITIONS OF EACH REPOSITORY PROPERTY TOKEN IN THE LIST OF ASSOCIATED REPOSITORIES
704

ASSOCIATE GLOBAL POSITIONS BLOCK WITH THE DOCUMENT BASED ON THE NUMBER OF REPOSITORY POSTINGS    706

ADD STARTNG POSITION OF THE GLOBAL POSITIONS BLOCK INTO GLOBAL STARTING POSITIONS TABLE    708

DETERMINE IF SPECAL  POSITION REFERENCE IS NEEDED    710

- IF # OF REPOSITORY PROPERTY POSTINGS  > THRESHOLD, RAISE SPECIAL POSITION REFERENCE

CONVERT EACH TOKEN POSITION INTO A GLOBAL POSITION    712

- IF SPECIAL POSITION REFERENCE RAISED, GLOBAL POSITION = GLOBAL STARTING POSITION
-IF SPECIAL POSITION REFERENCE NOT RAISED, GLOBAL POSITION  = GLOBAL STARTING POSITION + LOCAL POSITION

MERGE INTO HYBRID POSITIONAL POSTING LIST OF INVERTED INDEX TABLE    714

-ADD GLOBAL POSITION OF EACH REPO TOKEN INTO A RESPECTIVE HYBRID POSITIONAL POSTING LIST

GENERATE BITRANK ENTRY FOR THE DOCUMENT    716

-APPEND N+1 BITS TO THE END OF BITRANK VECTOR TO REPRESENT THE DOCUMENT
-SET FIRST BIT TO '1'

RETURN

HYBRID POSITIONAL POSTING LISTS

BACKGROUND

A search engine is often used to search for content contained in various documents stored in an information retrieval system. The search engine often relies on an indexing system to perform fast full text searches over a large number of documents. Most modern information retrieval systems utilize an inverted index system. The inverted index system relies on inverted indices to map a search term, such as a word, to locations in a document or a set of documents where the search term appears.

When the collection of documents is large containing billions of documents, the indexing system has to work efficiently at the enormous scale. There is a tradeoff between the index size and the search retrieval time. A long search retrieval time that spans several milliseconds may not be sufficient for the users of the information retrieval system. Increasing the index size does not always result in a faster search especially when there are many redundant documents. Hence, the viability of an information retrieval system relies on the efficient construction and use of its indexing system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An information retrieval system uses an inverted indexing system composed of hybrid positional posting lists. A hybrid positional posting list includes a number of postings, where each posting contains a single numeric value to represent both a document and the location of a term in the document. When the number of postings for the document exceeds a threshold, the single-valued posting represents all the locations of the term in the document.

The inverted indexing system may include a hybrid positional posting list for a content domain where the postings represent content located at a particular position in a specific document. The system may also include a hybrid positional posting list for a repository domain where each posting represents a repository property that is used as an index into a list of repositories associated with a document to find the repository storing the document having the repository property.

These and other features and advantages will be apparent from a reading of the following detailed description and a review of the associated drawings. It is to be understood that both the foregoing general description and the following detailed description are explanatory only and are not restrictive of embodiments as claimed.

BRIEF DESCRIPTION OF DRAWINGS

FIG. 6 is a flow diagram illustrating an exemplary method for generating a hybrid positional posting list for the content domain.

FIG. 7 is a flow diagram illustrating an exemplary method for generating the hybrid positional posting list for the repository domain.

DETAILED DESCRIPTION

Overview

Figure 1:
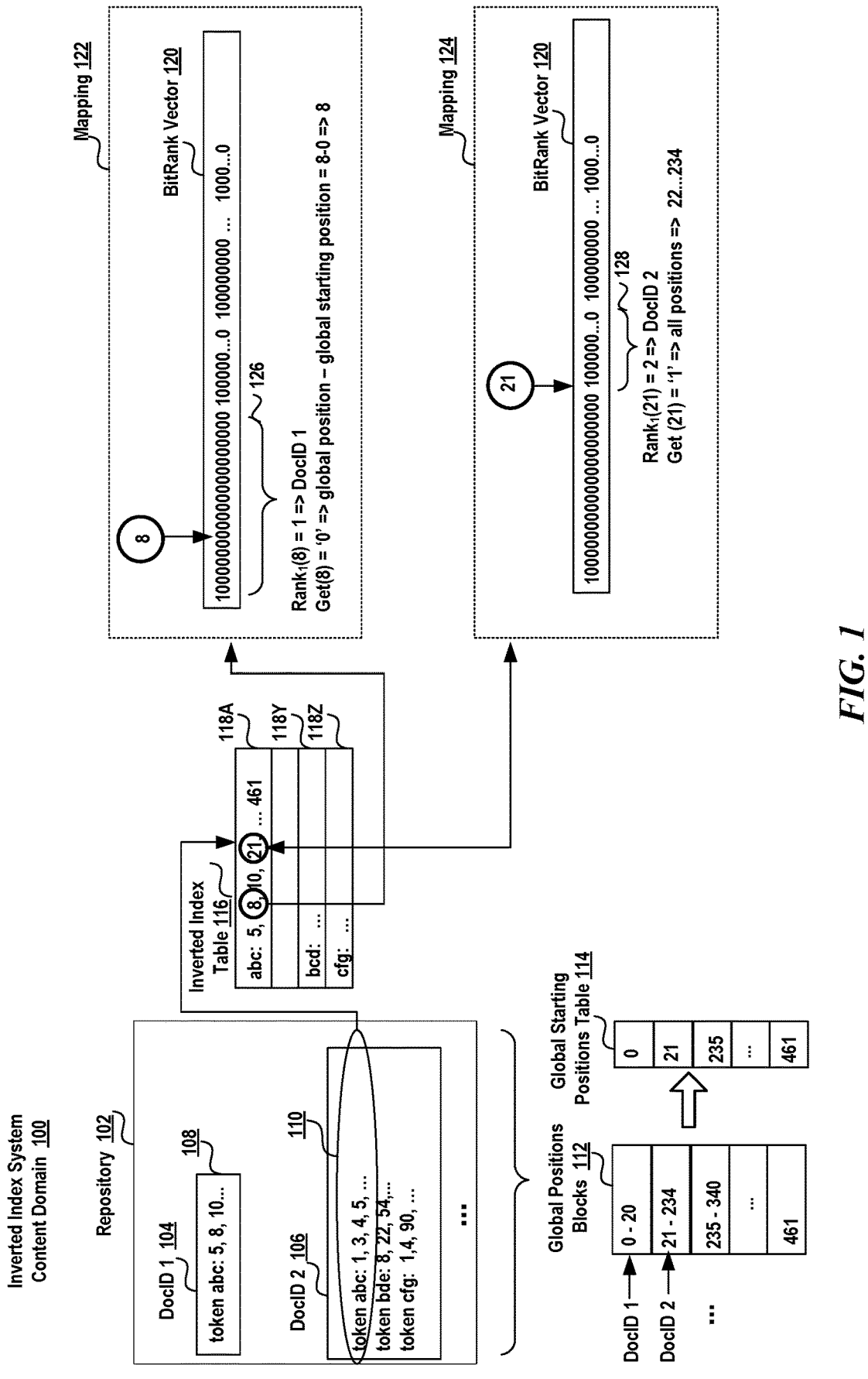
FIG. 1 is a schematic diagram illustrating an exemplary inverted indexing system having hybrid positional posting lists for a content domain.

The embodiments disclosed herein pertain to the generation of a hybrid positional posting list for an inverted indexing system of an information retrieval system and the application of the hybrid positional posting list in the information retrieval system.

The information retrieval system uses a database and/or a repository to store documents. The database or repository may be a local storage database or a distributed database that is connected by a network, such as the Internet. The database stores or otherwise has access to documents that may include web pages, source code files, blog posts, books, emails, text files, listing of data, or other types of electronic data.

The information retrieval system uses an inverted index system to map a term to a document or repository. The inverted indexing system uses an inverted index composed of posting lists for the terms contained in a collection of documents. A posting list is a collection of postings for a term. A posting identifies a location of the term and is sometimes referred to as an index. There are two common types of posting lists. A document posting list includes a collection of postings where each posting identifies a document containing a term. The document posting list is fairly compact but cannot support a phrase query where the search is for a sequence of tokens in a particular order. A document posting identifies the documents where a term occurs but not in any particular order.

The second common type of posting list is a positional posting. A positional posting list includes postings that identify a document and the location of a term within the document. A positional posting can support a phrase query but at the expense of a higher storage cost. The storage cost is based on the size of number of postings and the repetitiveness of the documents within a posting.

Most of the storage overhead of the inverted index is due to the size of the posting lists. The size of a posting list varies since it is based on how frequently a term occurs in each document and how often a document is duplicated. Minimizing the size of the posting list is important to reducing its storage overhead and in achieving a fast search.

A hybrid positional posting list uses a single value as a posting or index to represent a document posting and a positional posting. In some cases where a posting occurs in many positions in a document, a special position reference is used to denote all the positions in a document instead of creating individual postings for each occurrence. The special position reference reduces the size of the posting list.

The inverted indexing system uses a global positions block and a bitrank vector to map the single-value posting to a document identifier and the local positions within the corresponding document. The global positions block is a range of numeric values assigned to each document. Each numeric value in a range represents a global position for each token in the document. The starting value of each block is stored in a global starting positions table and used to map a posting to a document ID and its local positions. The bitrank vector is used to map a posting into a corresponding document identifier and its local positions.

In one embodiment, an inverted index maps a token or term into a position in a document of a repository. In this embodiment, the token represents the content of a document. A token may be a whole word, number, or a sequence of characters. The sequence of characters may include a bigram, a trigram, an n-gram, or a UTF-8 sequence. A bigram is a sequence of two consecutive elements from a string of characters. A trigram is a sequence of three consecutive elements from a string of characters. For example, the trigrams for the character sequence "abcdefg" include "abc", "bcd", "cde", "def" and "efg." In general, an n-gram is a sequence of n-consecutive elements from a string of characters. A Unicode Transformation Format 8-bit (UTF-8) sequence is a variable-width encoding that represents each character from a Unicode character set.

In one embodiment, the token is a trigram and the inverted index maps a trigram to the locations in each document where the trigram is found in the document. An inverted index table includes multiple posting lists for each trigram within a collection of documents. The trigrams that occur in a collection of documents is referred to as a vocabulary.

In another embodiment, the inverted index maps a token, such as a repository property, into a document identifier and a position within a list of repositories associated with the document identifier. The position within the list of repositories identifies the repositories associated with the document that have the repository property.

In general, a hybrid positional posting list contains postings for a token where a posting represents a document identifier and a position of the token in a document. The token may be content, a repository property, or a symbol. The symbol can represent other information, such as without limitation, source code methods, API, code elements, etc. The document may be a text file, source code program, a list of repositories associated with a document, etc.

Content Domain Mapping

FIG. 1 illustrates an exemplary inverted index system that indexes documents within a content domain 100. A search within the content domain uses the inverted index system to map tokens into a position in a document where the token is found. In one embodiment, a position is a line number in the document. A repository 102 includes a number of documents, where each document is associated with a unique document identifier (doc ID) and each repository has a unique repository identifier (Repo ID).

As shown in FIG. 1, repository 102 includes two documents, docID 1 104, and docID 2, 106. DocID 1, 104, contains twenty trigram or token positions and a handful of them match the single trigram 'abc.' The local positions of the trigram "abc" include 5, 8, 10 and other positions not shown. The positions are local positions and are stored in array 108. A local position is a location of a term relative to a specific document.

DocID 2, 106, contains three trigrams, 'abc', 'bde', and 'cfg' where trigram abc' is located in local positions 1, 3, 4, 5 and other local positions in the document not shown.

Trigram 'bde' is located in local positions 8, 22, 54, and other local positions in the document not shown. Trigram cfg' is located in local positions 1, 4, 90, and other local positions in the document not shown. The listing of the postings is in a monotonically-increasing order.

Each document in the inverted index system is allocated a range of numbers referred to as global positions block 112. The global positions block 112 is a range of monotonically-increasing numbers that are unique to a document. A global positions block 112 is assigned to each document in the inverted index system. The first number in the range represents a special position reference and the following numbers in the range represent a global position for each relative position in the document. The size of the block is based on the number of positions in the document plus one additional position for the special position reference. The special position reference is used to represent all the positions of the document. The starting positions for each document are then stored in a global starting positions table 114. The global starting positions table 114 is used to map a local position of a token into a global position across all the documents in the inverted index system.

The inverted index table 116 contains a hybrid positional posting list 118A-118Z for each token used across all the collection of documents in the information retrieval system. A hybrid positional posting list may include a posting or index for each position within a document or use a single index to represent all the positions within a document. A mapping is performed that maps the global position in the inverted index table of a token into the document number of the document containing the token and the associated local positions within these documents using the global starting position of the documents and a bitrank vector.

The bitrank vector 120 is a compressed or succinct data structure that includes a collection of bits. There is a group of the bits for each document. The first bit of each group is set to '1' and represents a document. Each succeeding bit of each group represents a respective position in the document.

The bitrank vector 120 is used to map a posting to its respective document and local positions within the document. The entries of the bitrank vector are arranged in a monotonically-increasing order of document IDs. For example, the entry in the bitrank vector for document ID 5 immediately follows the last entry for document ID4. The entries of the bitrank vector are also based on the global positions block, where each first entry in the bitrank vector corresponds to a respective position in the global positions block for a document.

In this manner, the mapping is accomplished through a rank operation and a get operation. A rank operation counts the number of '1' bits up to and including the identified position (e.g., $rank_1(i)$ where i is the identified position). The output of the rank operation indicates the docID. The get operation identifies the value of a select bit of the bitrank vector (e.g., get (i)). When the output of the get operation for an identified position is set '1' b, then the bitrank setting indicates the special position reference which indicates that the posting is associated with all the local positions of the token in the document.

Inverted index table 116 contains a hybrid positional posting list 118A for the token 'abc' which includes global positions 5, 8, 10, 21, and 461. A global position is constructed for each local position. The global position is computed as the sum of the global starting position for the document and the local starting position of the token in the document.

For example, position 5 of token 'abc' from docID 1 is transformed into a global position of 5 computed as the sum of the global starting position for docID 1, which is 0, and its local position, 5, 0+5. Similarly position 8 of token 'abc' of docID 1 is transformed into global position 0+8=8 and position 10 of token 'abc' of docID 1 becomes 0+10=10. The positions of the tokens in docID 1 do not utilize the special position reference.

For the token 'abc' of docID 2, the global position for this token in docID 2 is represented as the single-value index or posting '21.' The inverted index system generates the special position reference for this token since the number of postings for this token in docID 2 exceeds a threshold. In this case, the single-value posting is computed as the global starting position for the document which is '21'.

FIG. 1 shows two exemplary mappings 122, 124 of two postings within a hybrid positional posting list, 118A. Mapping 122 illustrates the mapping of a single value posting that is not associated with a special position reference, such as the mapping of the single-value posting '8' into its respective document ID and local position. The first group of bits 126 in the bitrank vector 120 represent the first document, document ID 1. The rank operation, $rank_1(8)$, counts the number of '1' bits up to and including bit 8, 126. There is one '1' bit so $rank_1(8)=1$ which represents document ID 1.

The get operation on bit 8, get (8), returns the bit setting for position 8 in the bitrank vector 120 which is '0' b. When the bit setting is '0' b, the local position is computed as the difference of the global position and the global starting position, 8−0=8.

Mapping 124 illustrates the mapping of the hybrid positional posting for '21' which is associated with a special position reference. The second group of bits in the bitrank vector 128 represent docID 2. The rank operation, $rank_1(21)$, counts the number of '1' bits up to and including bit 21. There are two '1' bits so $rank_1(21)=2$ which represents document ID 2. The get operation on bit 21, get (21), returns the bit setting for position 21 in the bitrank vector 120 which is '1' b. This bit setting indicates the special position reference which represents all the positions in document ID 2.

All the positions of document ID 2 include all the local positions of each token of document ID2 which include local positions 1, 2, 3, 4, 5, and others in document ID 2. These local positions are derived from the global starting positions table 114 for document ID 2 and the next entry in the global starting positions table 114. For the example shown in mapping 124, all the positions of document ID 2 include global positions 22 through 234 (i.e., global starting position (document ID 2)+1 through global starting position (document ID 3)−1).

In mapping 124, the special position reference includes positions that are false positives, that is, the special position reference includes positions that are not associated with the token 'abc.' This is intentional since the technique aims to reduce the inverted index size realizing that at search time, there would be a small number of false positives. The small number of false positives is controlled by the threshold (i.e., sqrt(n)) used to determine when to use the special position reference since the threshold targets large documents, that is, documents with a large number of postings. In addition, a search typically contains multiple terms which are often more restrictive ensuring that the search is constrained without having to use all the positions in the document.

Repository Domain Mapping

The inverted mapping technique may also be applied to other domains. In a repository domain, the inverted mapping technique uses repository properties as an index to a document and position in a list of repositories associated with the document. The position of the list of repositories identifies one or more repositories having the repository property.

A repository is associated with properties which are characteristics of the repository. The properties include owner name (OwnerID), repository name (RepoID), repository visibility (e.g., public/private), default branch (e.g., pathname), permissions, associated organizations (e.g., corporate users, collaborators and teams), repository roles, permission levels, administrators, programming language, license, etc.

Figure 2:
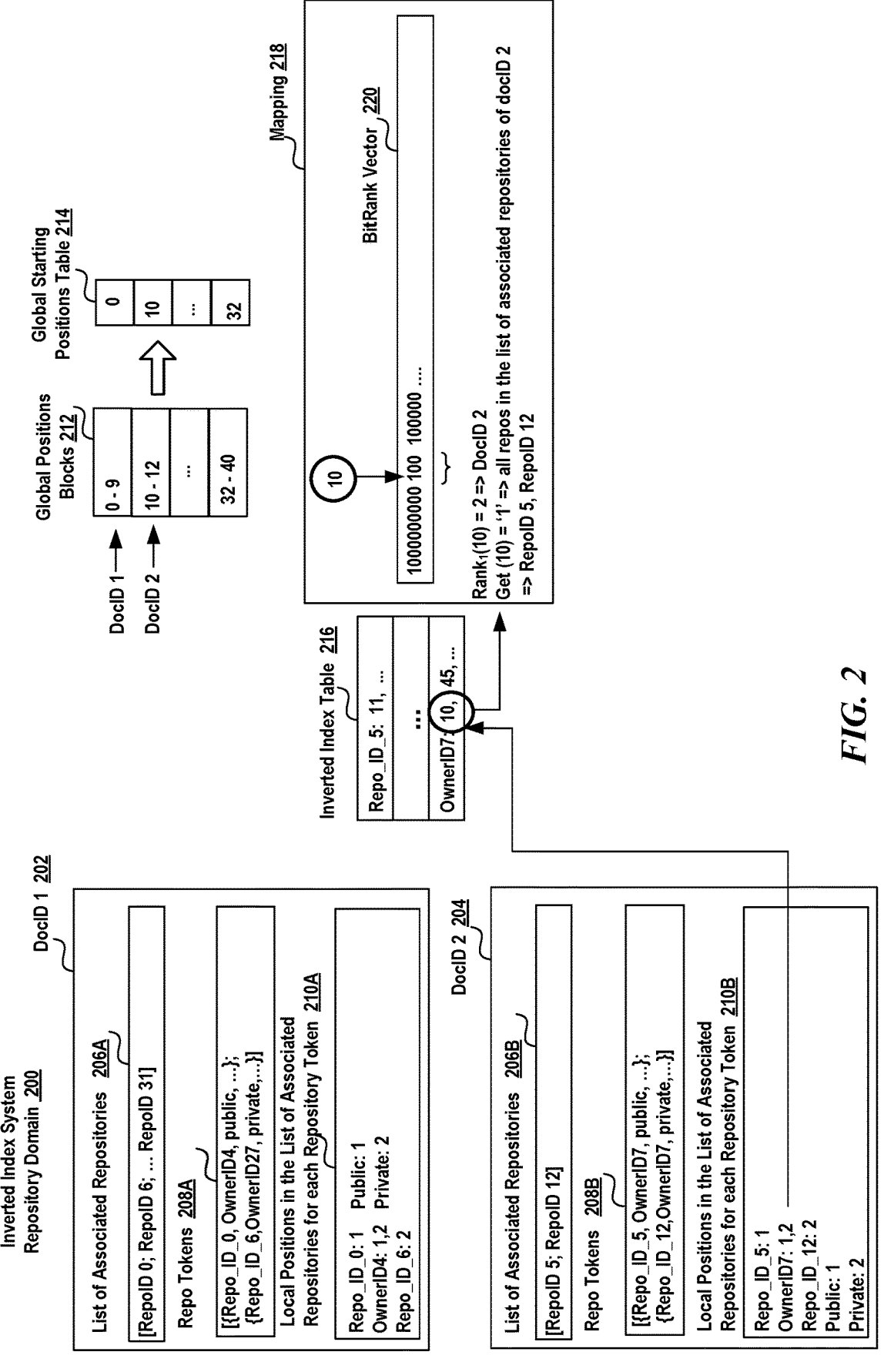
FIG. 2 is a schematic diagram illustrating an exemplary inverted indexing system having hybrid positional posting lists for a repository domain.

Turning to FIG. 2, there is shown an exemplary illustration of an inverted index mapping for a repository domain 200. The information retrieval system contains several documents, each identified by a unique document identifier. There is shown DocID 1 202 and DocID 2 204. Each document contains a list of repositories associated with a document. A document may occur in different repositories. Instead of storing a redundant document in each repository, metadata is stored in the document listing to identify the repositories containing the document. The metadata includes an ordered list of associated repositories, a list of repository tokens, and a list of local positions of the repository tokens.

As shown in FIG. 2, DocID 1 202 contains an ordered list of associated repositories 206A, a list of repository tokens 208A, and a list of the local positions of the repository tokens 210A. DocID 2 204 contains an ordered list of associated repositories 206B, a list of repository tokens 208B, and a list of the local positions of the repository tokens 210B.

There is a global positions blocks for the global positions of the repository tokens 212 and a global starting positions table 214. The global positions blocks 212 includes a range of numeric values for each document where each numeric value represents either a special position reference or a global position of a repository token. The global starting positions table 214 contains the starting position of each block.

The inverted index table 216 contains a hybrid positional posting list for each repository token. As shown in table 216 there is an entry for repository token Repo Id 5 and OwnerID7. The postings or index in each posting represents a single value that is mapped to a respective document ID and a position in the list of the repositories associated with the document. The position identifies one or all repositories.

For example, the mapping of the repository token OwnerID7 is performed using the bitrank vector 220 and the rank and get operations. The posting for OwnerId7 is the global position '10.' The $rank_1(10)=DocID 2$ since there are two '1' bits from position 10 in the bitrank vector. The get (10)='1' bit indicating the special position reference indicating that all the positions in the list of associated repositories are found. The list of associated repositories for DocID 2 includes RepoID 5 and RepoID 12, 206B.

Cross-Domain Mapping

In another embodiment, the hybrid positional posting list is used to search for documents using postings from different domains. Each domain uses distinct tokens. In the content domain, the inverted index is a token that represents the content of a document and in the repository domain, the inverted index is a repository property.

A query may contain search terms from different domains, such as a search term from the content domain and a search term from a repository domain. The inverted mapping technique is able to search from one domain and to another domain using the mapping components in order to more readily find documents matching the postings that intersect both domains.

Figure 3:
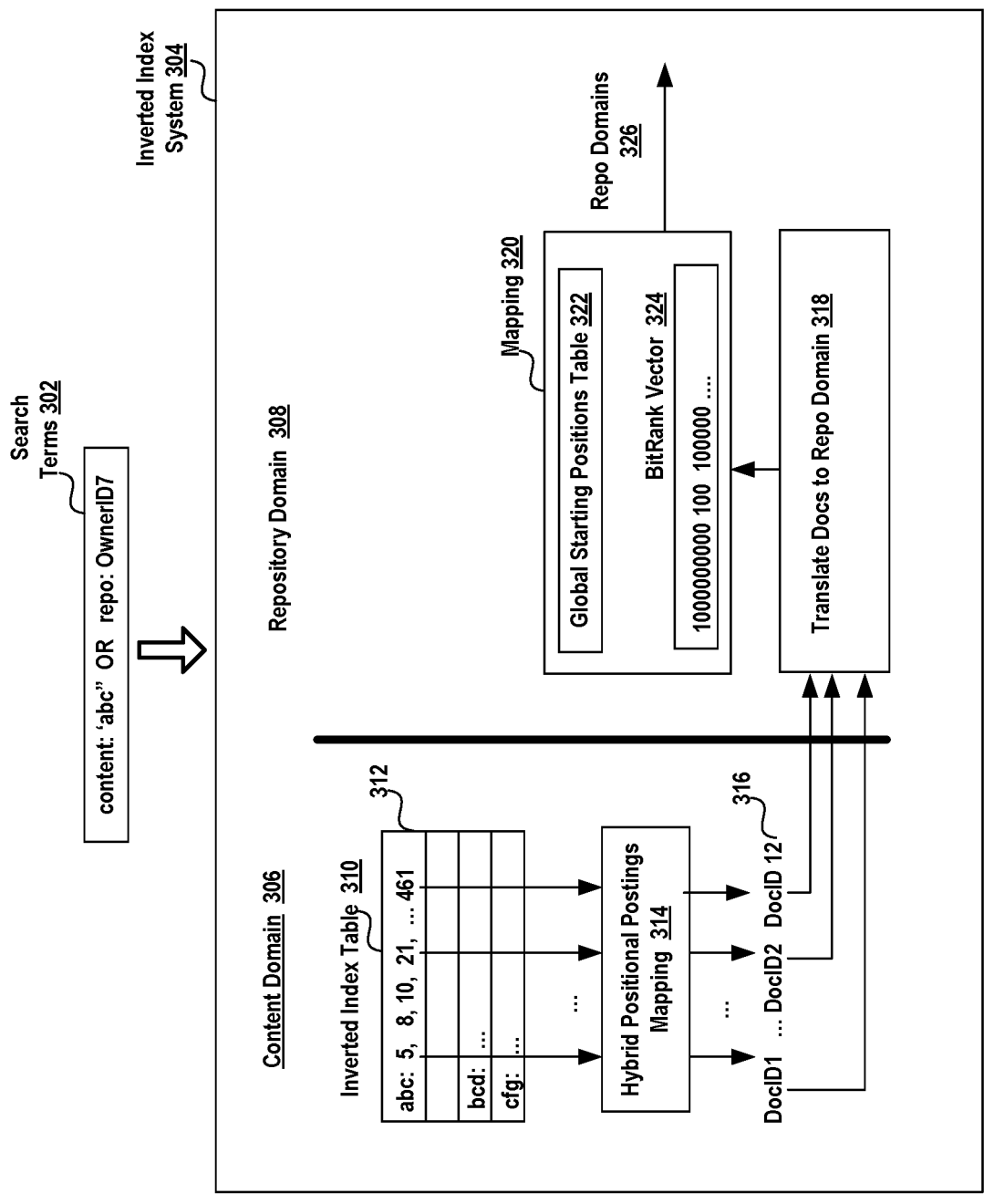
FIG. 3 is a schematic diagram illustrating an exemplary mapping from a content domain to a repository domain.

Turning to FIG. 3, there is shown an example of a cross-domain mapping 300 for the search operation "content: abc OR repo: OwnerID7" 302. The cross-domain mapping includes searching for the term 'abc' in the content domain 306 and searching for the term 'OwnerID7' in the repository domain 308. The search may use the global postings for the term 'abc' 312 in the inverted index table of the content domain 310 to map, using the hybrid positional posting mapping 314, to a document containing the term, DocID1, DocID2, . . . DocID12 316. Each document is mapped into its associated repositories 318 using a mapping 320 that includes the global starting positions table of the repository domain 322 and the bitrank vector of the repository domain 324.

The global starting position for each document is obtained from the global starting positions table in the repository domain. The document identifier from the content domain is used to lookup, in the global starting positions table of the repository domain, the global starting position of the document in the repository domain. Since the starting position of each document was chosen as the global posting position in the repository domain, the search engine will automatically interpret the position as the special reference position (i.e., all repositories associated with the document). Hence, the bit setting for the global starting position in the bitrank vector of the repository domain will be '1' b and all the repositories associated with the document are returned.

Attention now turns to a more detailed description of the system of the inverted index mapping technique.

System

Figure 4:
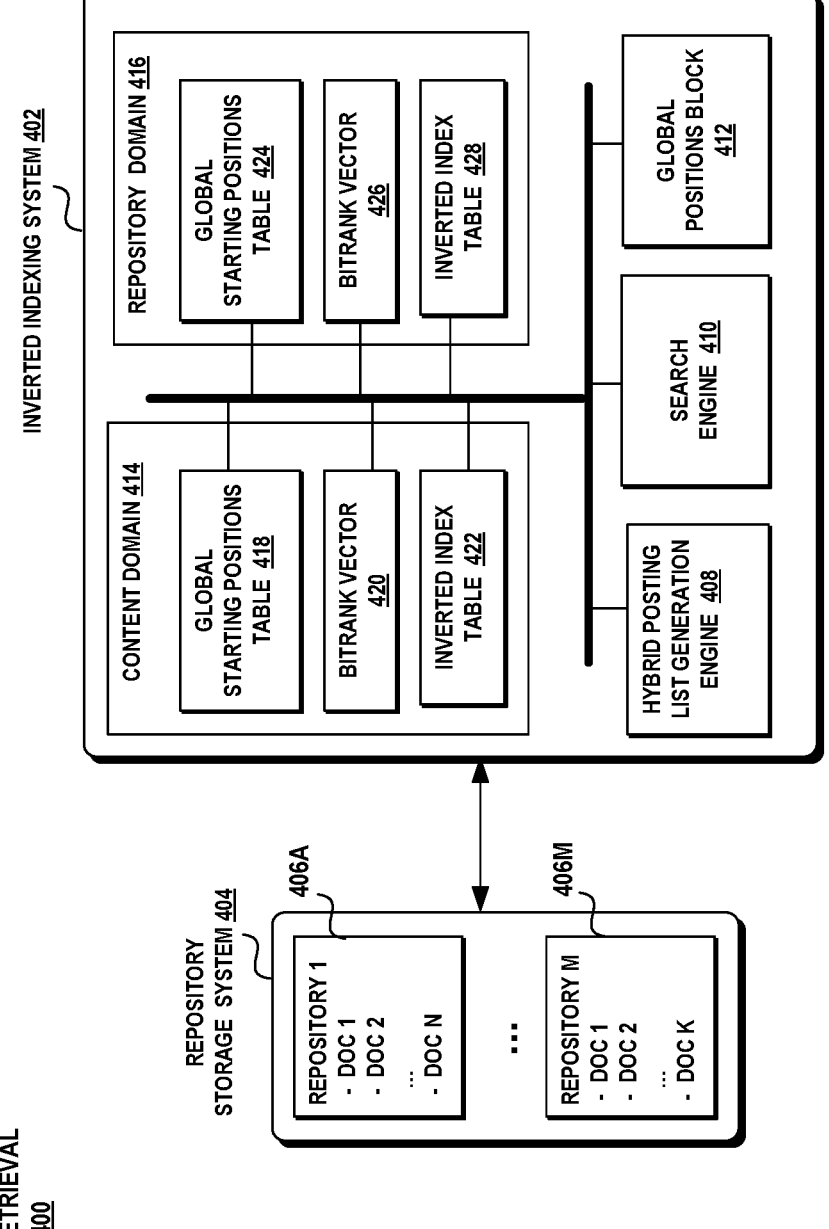
FIG. 4 is a block diagram of the components of an exemplary information retrieval system utilizing an inverted indexing system having hybrid positional posting lists.

Turning to FIG. 4, there is shown an exemplary information retrieval system 400 having an inverted index system 402 incorporating hybrid positional posting lists. The information retrieval system 400 includes a repository storage system 404 that hosts a number of repositories associated with a number of documents. The repository storage system 404 is communicatively coupled to the inverted mapping system 402.

The inverted mapping system 402 includes a hybrid inverted index generation engine 408, a search engine 410, global positions blocks 412, and separate mapping components for each domain. The inverted index generation engine 406 constructs the mapping components and the search engine 408 uses the mapping components to perform a search. The global positions block 412 includes the range of global positions assigned to each document in the information retrieval system.

For each domain 414, 416, there is a global starting positions table 418, 424, a bitrank vector 420, 426, and an inverted index table 422, 428. The global starting positions table 418, 424 includes the value of the starting position of each global positions block. The bitrank vector 420, 426, is used to perform the hybrid mapping. The inverted index table 422, 428 contains the posting lists for each index.

As shown in FIG. 4, there is a global starting positions table 418, bitrank vector 420, and inverted index table 422 for the content domain and a global starting positions table 424, bitrank vector 426 and inverted index table 428 for the repository domain 416.

The repository storage system 404 includes one or more repositories 406A-406M storing various documents. In one embodiment, the information retrieval system is a distributed version control and source code management service, such as GitHub. The system uses a repository storage system to store documents and other related files, and each file's revision history in a dedicated project folder. The documents may include source code files, source code test files, text files, documentation, test data, and the like.

Methods

Attention now turns to a description of the various exemplary methods that utilize the system and device disclosed herein. Operations for the embodiments may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more embodiments, the method illustrates operations for the systems and devices disclosed herein.

Figure 5:
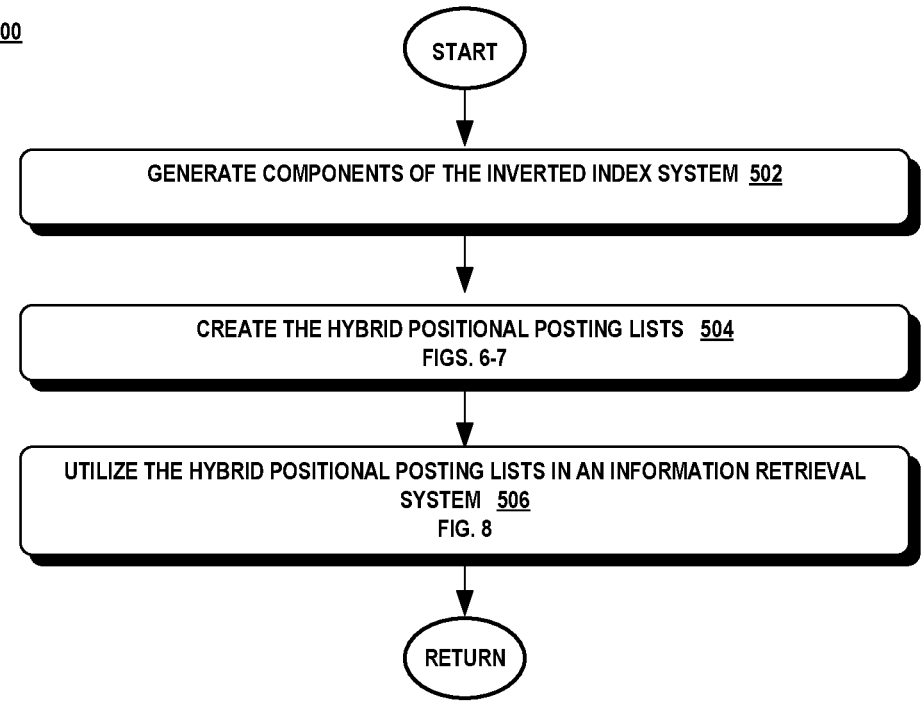
FIG. 5 is a flow diagram illustrating an exemplary method of an information retrieval system having an inverted indexing system with hybrid positional posting lists.

FIG. 5 is an exemplary method 500 of the information retrieval system. Initially, the values for the global positional blocks, the global starting positions table, and the inverted index table are generated. (Collectively, block 502).

As each document is added to the information retrieval system, the hybrid inverted index generation engine adds a hybrid positional posting into a hybrid positional posting list of a respective inverted index table and updates the global starting positions table and bitrank vector as described in more detail below (block 504).

Upon completion of the inverted index system, the search engine is used in the information retrieval system to perform queries which is described in more detail below (block 506).

Turning to FIG. 6, there is shown an exemplary method for generating the hybrid positional postings 600 for tokens representing content. In one embodiment, the inverted index generation engine processes new documents added to an information retrieval system in batches. The documents are sorted by monotonically-increasing document identifier numbers (docID). Each document is analyzed in turn (block 602).

Each document is parsed into tokens and a list of all the tokens in each document is generated along with the local positions of each token in the document (block 604). The list of tokens and their corresponding local positions are stored (block 606).

The number of local positions in the document is computed (block 608) and used to allocate a global positions block for the document (block 608). As noted above, the global positions block is a range of numbers where each number represents a position of a token in the document (block 608). The starting position of each global position block is then added to the global starting positions table (block 610).

The number of positions that occur for a specific token in a document is compared against a threshold in order to determine whether a single posting should represent all the positions in the document for the token or to repeat each position with a separate posting. In one embodiment, the threshold is the square root of the number of postings (e.g., $\sqrt{n_j}$, where n is the number of posting of token j in the document). The use of the special position reference is advantageous for the situation where a token occurs frequently in a document. A single posting is used to represent all the positions thereby reducing the overhead of the positional posting lists. (Collectively, block 612).

The position of each token in the document is then converted into a global position. The global position is with respect to the positions of all the tokens in the information retrieval system. For the token associated with a special position reference, the global position is the global starting position of the document. For a token that is not associated with a special position reference, the global position is the sum of the global starting position of the document and the corresponding local position. (Collectively, block 614).

Each global position is then added as a posting in the hybrid positional posting list of the token (block 616). Upon completing the conversion of each token into a posting, an entry for the document is appended to the bitrank vector (block 618). The entry includes a group of n+1 bits, where n is the number of local positions in the document. The first bit of the group is set to '1' b representing that the next n bits belongs to the document (block 618).

FIG. 7 is a flow chart illustrating an exemplary method for generating the hybrid positional postings 700 for tokens that represent repository properties. As each document is processed (block 702), a list of associated repositories containing the document is generated, a list of repository properties or tokens associated with each repository associated with the document, and a list of positions of each repository token associated with a repository identified in the list of associated repositories (block 704).

The number of positions of all the repository tokens associated with the repositories is computed and used to allocate a global positions block for the document (block 706). The starting position of each global position block is then added to the global starting positions table (block 708).

The number of postings for a specific repository token is compared against a threshold in order to determine whether a single posting should represent all the positions in the list of associated repositories for the token or to repeat each position with a separate posting. In one embodiment, the threshold is the square root of the number of postings (e.g., $\sqrt{n_j}$), where n is the number of posting of repository token j in the associated repositories). (Collectively, block 710).

The position of each repository token in the list of associated repositories is then converted into a global position. For the token associated with a special position reference, the global position is the global starting position of the document in the repository domain. For a token that is not associated with a special position reference, the global position is the sum of the global starting position of the document and the corresponding local position. (Collectively, block 712).

Each global position is then added as a posting in the hybrid positional posting list of the repository token (block 714). Upon completing the conversion of each repository token into a posting, an entry for the document is appended to the bitrank array (block 716). The entry includes a group of n+1 bits, where n is the number of associated repositories. The first bit of the group is set to '1' b representing that the next n bits belongs to the document (block 716).

Search

Figure 8:
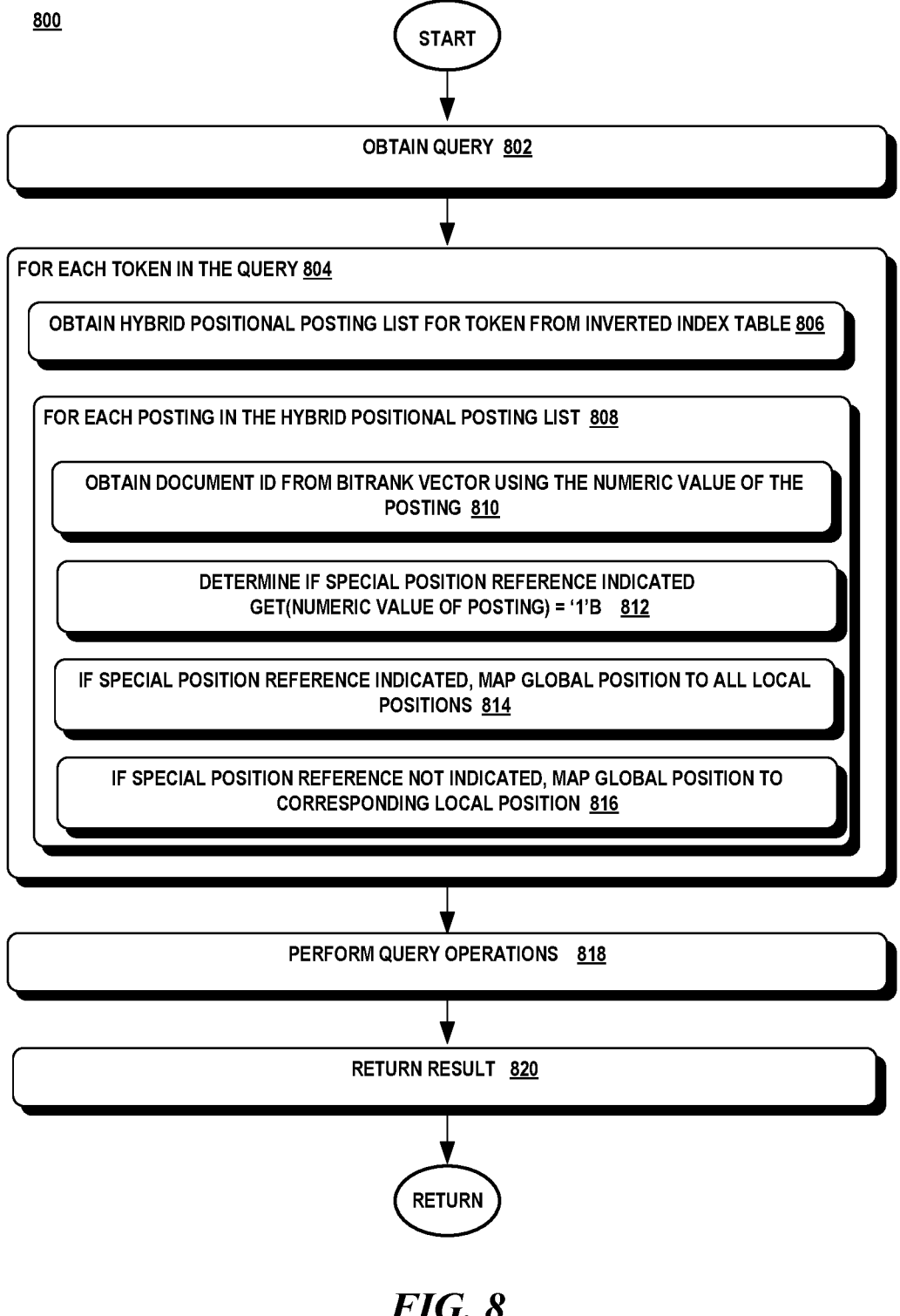
FIG. 8 is a flow diagram illustrating an exemplary method for searching a term with the hybrid positional posting lists.

FIG. 8 illustrates an exemplary method 800 to search for a term using the hybrid positional posting lists. In one aspect, a Boolean search is used which consists of a list of terms that are combined with Boolean operators, such as AND, OR, NOT. An AND operation is performed as the intersection of two posting lists in order to find the next document that contains both terms. Since the hybrid positional posting lists are sorted, the full intersection of the two posting lists is not needed rather the next posting that satisfies the desired criteria is output. The OR operation finds the next document that contains one of the terms. The NOT operation finds the next document that does not contain the term. In order to perform these operations, the hybrid positional postings for each term are retrieved from the inverted index table. A mapping is then performed to obtain the document identifier and local positions within the document for each term of the query. The Boolean operations are performed using the document identifier and local positions associated with each term.

Turning to FIG. 8, the search engine receives a query containing tokens and operators (block 802). For each token in the query (block 804), the search engine uses the token to find the associated hybrid positional posting list for the token in the inverted index table (block 806). For each posting in the hybrid position posting list (block 808), the single numeric value of the posting is mapped into a document identifier using the bitrank vector (block 810). The $rank_1$ operation is applied on the numeric value of the posting in the bitrank vector to obtain the document ID (block 810). The get operation is applied to the numeric value of the posting in the bitrank vector to determine if the special position reference has been raised for this document (block 812). The special position reference is raised when the bit setting for the numeric value of the posting in the bitrank vector='1' b (block 812).

If the special position reference is raised, then the local positions are obtained from the global starting positions table (block 814). The local positions start from the value of the global starting positions table+1 to the numeric value of the next entry in the global starting positions table−1 (block 814). When the special position reference is not raised, then the local position is computed as the difference of the global starting position from the global position (i.e., global position−global starting position) of the document (block 816).

Once the postings for each token are mapped into a respective document identifier and local positions, the query operation is performed (block 818) and the results returned (block 820).

It should be noted that the techniques disclosed herein are not limited to a Boolean search and other search algorithms may be used such as, without limitation, a phrase query, rank search, and the like.

Technical Effect

The techniques described herein are advantageous over prior solutions through the construction of the hybrid positional posting lists. Past solutions included both the document identifier and a local position as part of a positional posting which consumed a lot of storage. The inverted index tables are quite large and are often not stored in main memory. They consume a lot of disk space where disk accesses are relatively slow.

The technique described herein reduces the size of the inverted index tables through the hybrid positional postings list which accommodates a document with a small number of postings and a document with a large number of postings. The use of a single numeric value to represent both the document identifier and the local positions reduces the size of the posting lists. The special position reference is advantageous for documents with a larger number of postings since it eliminates a posting for each position thereby reduces the size of the posting lists.

Additionally, the hybrid positional posting lists allows the mapping from one domain to another domain which reduces the number of false positives for queries having searches in multiple domains. The reduction in the number of false positives reduces the computing resources needed to discard the many false positives in a subsequent step.

Hence, the subject matter disclosed herein pertain to the technical problem of searching for data in an inverted index system while minimizing the amount of computing processing and resources to generate and access the data of the inverted index system.

The technical features associated with addressing this problem is the hybrid positional posting list that uses a single numeric value to represent all positions of a token that is frequently occurring in a document or repository. The single numeric value is mapped into a corresponding document and local positions within that document using a mapping technique that relies on global positions starting position for the document and a bitrank vector.

The technical effect achieved is the reduction in the size of the positional posting lists for an inverted index table which improves the functioning of the computer since fewer computing resources are used to store and search the positional posting lists.

Exemplary Operating Environment

Figure 9:
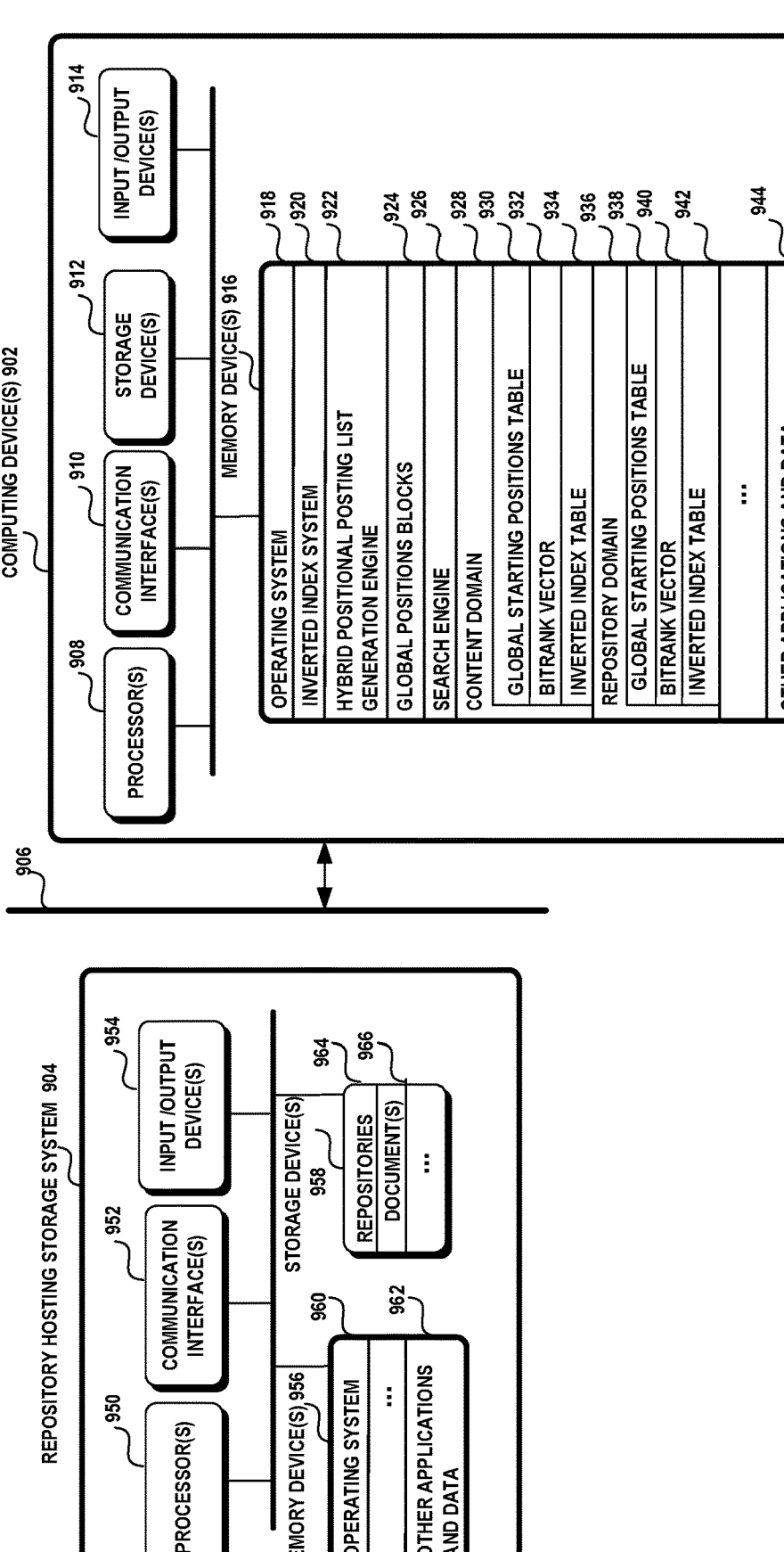
FIG. 9 is a block diagram illustrating an exemplary operating environment.

Attention now turns to a discussion of an exemplary operating environment. FIG. 9 illustrates an exemplary operating environment 900 in which one or more computing devices 902 are used to generate and access the hybrid positional posting lists for an inverted index system and one or more computing devices 904 are used as a repository hosting storage system that stores repositories of documents. The operating environment 900 may be configured as a cloud service that hosts the repositories and provides the inverted index system to index and access the documents for customers (i.e., users, developers). However, other configurations of the computing devices are possible and the operating environment is not limited to any particular configuration.

A computing device 902, 904 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 900 may be configured in a network environment, a distributed environment, a multi-processor environment, or a stand-alone computing device having access to remote or local storage devices.

A computing device 902, 904 may include one or more processors 908, 950, one or more communication interfaces 910, 952, one or more storage devices 912, 958, one or more input/output devices 914, 954, and one or more memory devices 916, 956. A processor 908, 950 may be any commercially available or customized processor and may include dual microprocessors and multi-processor architectures. A communication interface 910, 952 facilitates wired or wireless communications between a computing device 902, 904 and other devices. A storage device 912, 958 may be computer-readable medium that does not contain propagating signals, such as modulated data signals transmitted through a carrier wave. Examples of a storage device 912, 958 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 912, 958 in the computing devices 902, 904. The input/output devices 914, 954 may include a keyboard, mouse, pen, voice input device, touch input device, display, speakers, printers, etc., and any combination thereof.

A memory device or memory 916, 956 may be any non-transitory computer-readable storage medium that may store executable procedures, applications, and data. The computer-readable storage medium does not pertain to propagated signals, such as modulated data signals transmitted through a carrier wave. The computer-readable storage medium may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 916, 956 may also include one or more external storage devices or remotely located storage devices that do not pertain to propagated signals, such as modulated data signals transmitted through a carrier wave.

A memory device 916, 956 may contain instructions, components, and data. A component is a software program that performs a specific function and is otherwise known as a module, program, and/or application. The memory device 916 may include an operating system 918, an inverted index system 920, a hybrid positional posting list generation engine 922, a global positions blocks 924, a search engine 926, a content domain 928 including a global starting position table 930, a bitrank vector 932, and an inverted index table 934, a repository domain 936 including a global starting position table 938, a bitrank vector 940, and an inverted index table 942, and other applications and data 944.

Memory device 956 includes an operating system 960 and other applications and data 962. Storage device 958 includes repositories 964 and their associated documents 966.

A computing device 902, 904 may be communicatively coupled via a network 906. The network 906 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 906 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed comprising one or more processors and a memory. The memory stores one or more programs configured to be executed by the one or more processors. The one or more programs include instructions to perform acts to: obtain a first document for indexing into an inverted indexing system of an information retrieval system; tokenize the first document into a plurality of tokens, each token associated with a local position in the first document; map each of the local positions of a first token of the plurality of tokens in the first document into respective global positions; when the number of local positions of the first token in the document exceeds a threshold, generate a first hybrid positional posting for the first token, wherein the first hybrid positional posting includes a single number that represents both the first document and all the local positions of the first token in the first document; and insert the first hybrid positional posting into a hybrid positional posting list for the first token in the inverted index table.

In an aspect the one or more programs include further instructions to perform acts to: when the number of local positions of the first token is less than a threshold, generate a second hybrid positional posting for each location of the first token in the first document, wherein the second hybrid positional posting includes a single number to represent both the first document and each local position.

In an aspect, map the local position of the first token of the plurality of tokens in the first document into a respective global position further comprises: associate a range of global positions for the first document, wherein the range of global positions includes a numeric value for each position of each token in the first document; and map each position of the first token into a select one of the global positions of the range of global positions.

In an aspect, the first hybrid positional posting includes a numeric value in a first position of the associated range of global positions. In an aspect, the second hybrid positional posting includes a numeric value in a position of the associated range of global positions that is associated with the local position. In an aspect, the one or more programs include further instructions to perform acts to: generate an entry of n+1 bits to represent positions of the document, wherein a first bit of the n+1 bits represents the document, wherein each bit following the first bit represents a position of a token in the document.

In an aspect, the one or more programs include further instructions to perform acts to: append the entry of the first document into a bitrank vector, wherein the bitrank vector includes an entry for each document of the inverted indexing system. In an aspect, the tokens represent content within a document. In another aspect, the tokens represent properties of a repository associated with documents of the information retrieval system.

A first computer-implemented method is disclosed, comprising: obtaining a search query including at least one token and at least one operation; accessing an inverted index table for an information retrieval system hosting a plurality of documents, the inverted index table containing a plurality of hybrid positional posting lists; searching for a select hybrid positional posting list for the at least one token, wherein the select hybrid positional posting list includes at least one single-valued posting; mapping the at least one single-valued posting into a document identifier and local positions of the at least one token in a document associated with the document identifier; and performing the at least one operation using the document identifier and the local positions.

In an aspect, the first computer-implemented method further comprises: obtaining a bitrank vector having an entry for each document, where an entry for a document includes a first bit representing a special position reference and each succeeding bit represents a position of a token in the document; and mapping the at least one single-value posting into a document identifier using a rank operation applied to a position of the bitrank vector at the at least one single-value posting.

In an aspect, the first computer-implemented method further comprises: determining that a special position reference is indicated by getting a bit setting in the bitrank vector at the position of the at least one single-value posting. In an aspect, the first computer-implemented method further comprises: identifying all positions of the document identifier as all the local positions in the document when the bit setting is on. In an aspect, the first computer-implemented method further comprises: identifying a single position of the document identifier as a single local position in the document when the bit setting is off. In an aspect, the token represents a repository property or content.

A second computer-implemented method is disclosed comprising: accessing an inverted index table of an information retrieval system, wherein the inverted index table includes a hybrid positional posting list for a repository property, wherein a hybrid positional posting list includes at least one posting for the repository property; obtaining a first document stored in a first repository, wherein the first document contains a list of associated repositories storing the first document; obtaining a first repository property associated with the first repository; mapping the first repository property into a respective global position; generating a first posting for the first repository property, the first posting including a single numeric value to represent a document identifier of the first document and a position in the list of associated repositories of the first document having the repository property; and inserting the first posting for the repository property into the hybrid positional posting list of the inverted index table.

In an aspect, the second computer-implemented method further comprises: determining a number of postings associated with the first repository; and when the number of postings exceeds a threshold, setting the single numeric value to represent the first document identifier and all positions in the list of associated repositories associated with the first document.

In an aspect, the second computer-implemented method further comprises: determining a number of postings associated with the first repository; and when the number of postings is less than a threshold, setting the single numeric value to represent the first document identifier and a single position in the list of associated repositories associated with the first document.

In an aspect, the second computer-implemented method further comprises: mapping the repository property to a global starting position of the first document. In an aspect, the second computer-implemented method further comprises: appending an entry for the first document into a bitrank vector, wherein the bitrank vector includes an entry for each document, wherein an entry for a document includes a first bit representing a special position reference and each succeeding bit represents a position in a list of repositories associated with the document.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors; and
one or more hardware storage devices that store instructions that are executable by the one or more processors to cause the system to:
access a first document of that is included among a plurality of documents of an information retrieval system, the information retrieval system uses an inverted index table to map tokens that are included in the plurality of documents, wherein:
the inverted index table comprises a hybrid positional posting list for the tokens included in the plurality of documents,
the hybrid positional posting list comprises a plurality of postings,
a posting of the plurality of postings for a select token comprises a single numeric value that identifies a document identifier and a positional identifier,
the single numeric value is mapped to the document identifier and the positional identifier using a bitrank vector and a global position block,
the document identifier identifies a select document of the plurality of documents comprising the select token,
the positional identifier identifies a special position reference or a global position of the select token relative to the plurality of documents, and
the special position reference for the select document identifies all of the positions of the plurality of tokens in the select document;
tokenize the first document into a plurality of tokens, wherein each token of the plurality of tokens is associated with a corresponding local position in the first document;
map local positions of the plurality of tokens in the first document to corresponding global positions, which are global across all the documents in the plurality of documents, wherein said mapping is based on the global position block for the first document;
when a number of the local positions in the first document exceeds a first threshold:
generate a first posting for a first token comprising the special position reference for the first document; and
insert the first posting into a hybrid positional posting list for the first token in the inverted index table; and
when the number of local positions in the first document does not exceed the first threshold, generate a second posting for the first token comprising a second single numeric value to represent both the first document and a select global position of the first token at a select location in the first document.

2. The system of claim 1, wherein the instructions are further executable to cause the system to:
generate an entry of n+1 bits to represent positions of tokens in the first document, wherein a first bit of the n+1 bits represents the first document, and wherein each bit following the first bit represents a position of a select token in the first document.

3. The system of claim 2, wherein the instructions are further executable to cause the system to:
append an entry of the first document into the bitrank vector, wherein the bitrank vector includes an entry for each document of the information retrieval system.

4. The system of claim 1, wherein the plurality of tokens represent content within the first document.

5. The system of claim 1, wherein the plurality of tokens represent properties of a repository associated with the plurality of documents of the information retrieval system.

6. A computer-implemented method comprising:
obtaining a search query including at least one token and at least one operation;
accessing an inverted index table for an information retrieval system hosting a plurality of documents, the inverted index table comprising a plurality of hybrid positional posting lists, wherein:
a hybrid positional posting list comprises a plurality of postings, and
a posting of the plurality of postings comprises a single numeric value that identifies a specific document of the plurality of documents including a select token and global positions of the select token within the plurality of documents;
searching for a first hybrid positional posting list for a first token, wherein the first hybrid positional posting list comprises a first posting comprising a first single numeric value for the first token;
mapping the first single numeric value of the first posting into a document identifier and a positional identifier, wherein the single numeric value is mapped to the document identifier and the positional identifier using a bitrank vector and a global position block, wherein the document identifier identifies a first document comprising the first token, and wherein the position identifier identifies a position of the first token in the first document; and
performing at least one operation using the document identifier and the first positional identifier associated with the at least one token.

7. The computer-implemented method of claim 6, comprising:
accessing the bitrank vector, which includes an entry for the first document, where the entry for the first document in the bitrank vector includes a first bit representing a special position reference and each succeeding bit representing a position of the first token in the document; and
mapping the single numeric value of the first posting into the document identifier using a rank operation applied to a select position of the bitrank vector associated with the first document.

8. The computer-implemented method of claim 7, further comprising:
obtaining a bit setting in the bitrank vector for a first bit in the bitrank vector for the first document; and
determining that the special position reference is indicated when the bit setting is on.

9. The computer-implemented method of claim 8, further comprising:
when the bit setting is on, map all global positions in the first document into respective local positions.

10. The computer-implemented method of claim 8, further comprising:
identifying a single position of the document identifier as a single local position in the first document when the bit setting is off.

11. The computer-implemented method of claim 8, wherein the token represents a repository property or content.

12. A computer-implemented method comprising:

accessing an inverted index table for a plurality of repositories of an information retrieval system, wherein:

the inverted index table includes a hybrid positional posting list for a repository property, the repository property is a characteristic of a repository of the plurality of repositories, a hybrid positional posting list includes at least one posting for the repository property, the at least one posting for the repository property comprises a single numeric value that comprises a document identifier and a positional identifier, the single numeric value is mapped to the document identifier and the positional identifier using a bitrank vector and a global position block, the document identifier identifies a document stored in one of the plurality of repositories having the repository property, and the positional identifier identifies a select repository storing the document having the repository property from a position in a list of associated repositories for the document;

obtaining a first document stored in a first repository of the plurality of repositories, wherein the first document contains a first list of associated repositories storing the first document;

obtaining a first repository property associated with the first repository;

mapping the first repository property into a respective global position within the first list of associated repositories storing the first document;

generating a first posting for the first repository property, the first posting comprising the single numeric value, which is mapped to the document identifier and the positional identifier, wherein the document identifier identifies the first document and the positional identifier identifies a position in the list of associated repositories storing the first document having the repository property; and inserting the first posting for the first repository property into the hybrid positional posting list of the inverted index table.

13. The computer-implemented method of claim 12, wherein generating the first posting for the first repository property further comprises:

determining a number of postings associated with the first repository property; and when the number of postings associated with the first repository property exceeds a threshold, setting the single numeric value of the first posting to identify the first document and all global positions in the list of associated repositories associated with the first document.

14. The computer-implemented method of claim 12, wherein generating the first posting for the first repository property further comprises:

determining a number of postings associated with the first repository property; and when the number of postings is less than a threshold, setting the single numeric value to identify the first document and a single position in the list of associated repositories associated with the first document having the first repository property.

15. The computer-implemented method of claim 12, wherein mapping the first repository property into a respective global position further comprises:

mapping the first repository property to a global starting position of the first document.

16. The computer-implemented method of claim 15, further comprising:

appending an entry for the first document into the bitrank vector, wherein the bitrank vector includes an entry for each document in the plurality of repositories, wherein an entry for a document includes a first bit identifying a special position reference and each succeeding bit identifies a position in the list of repositories associated with the first document having the first repository property.

* * * * *